United States Patent Office 3,220,760
Patented Nov. 30, 1965

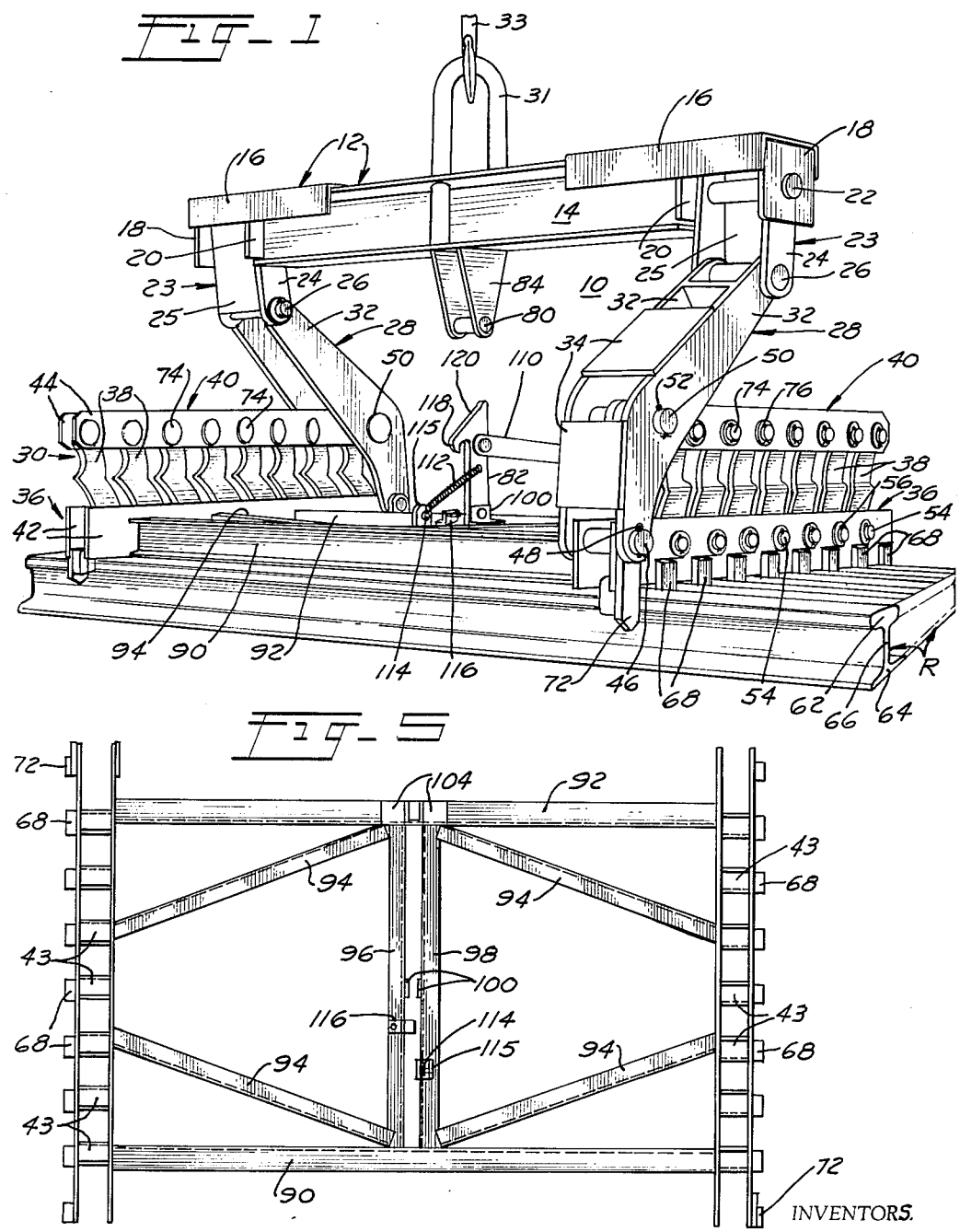

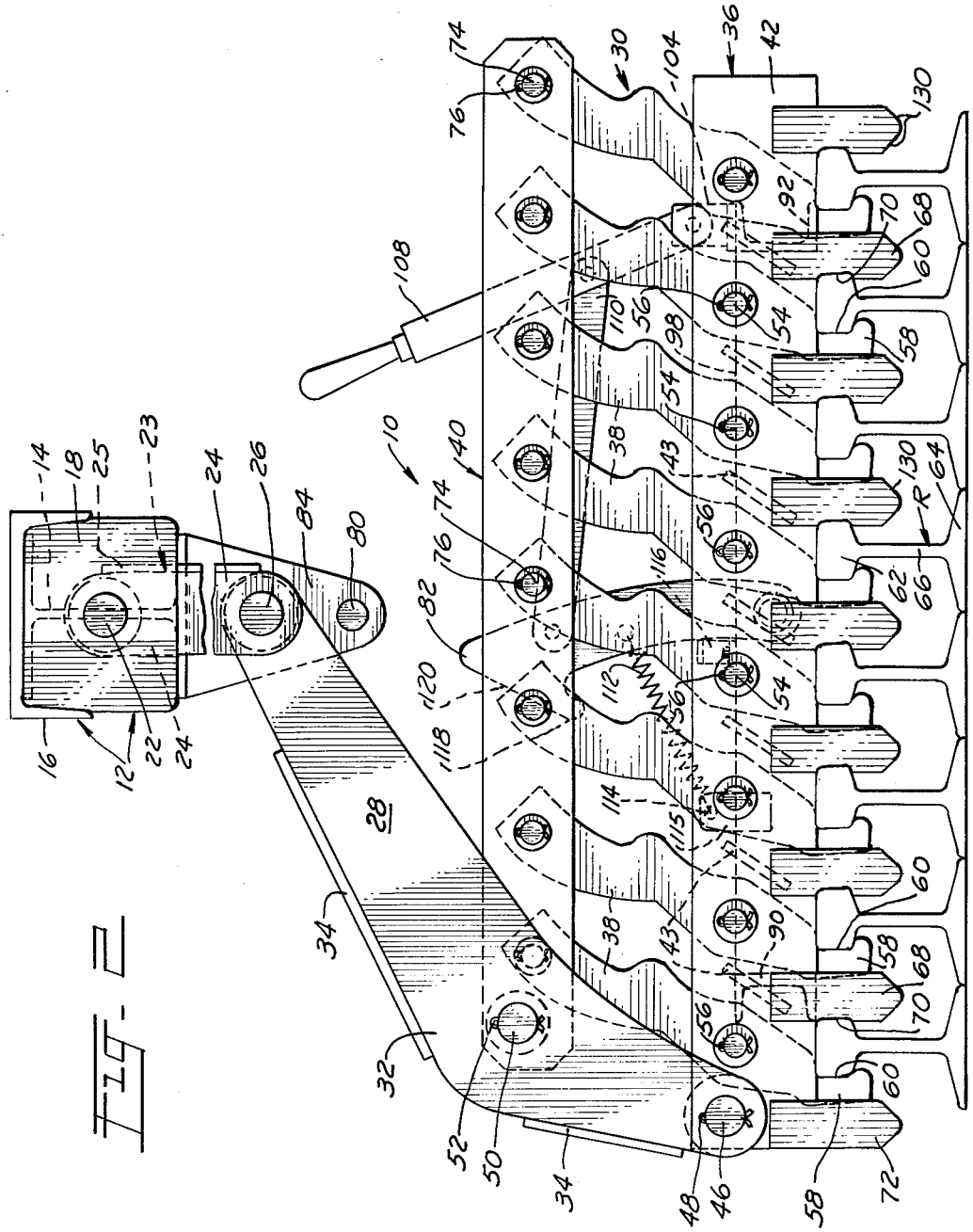

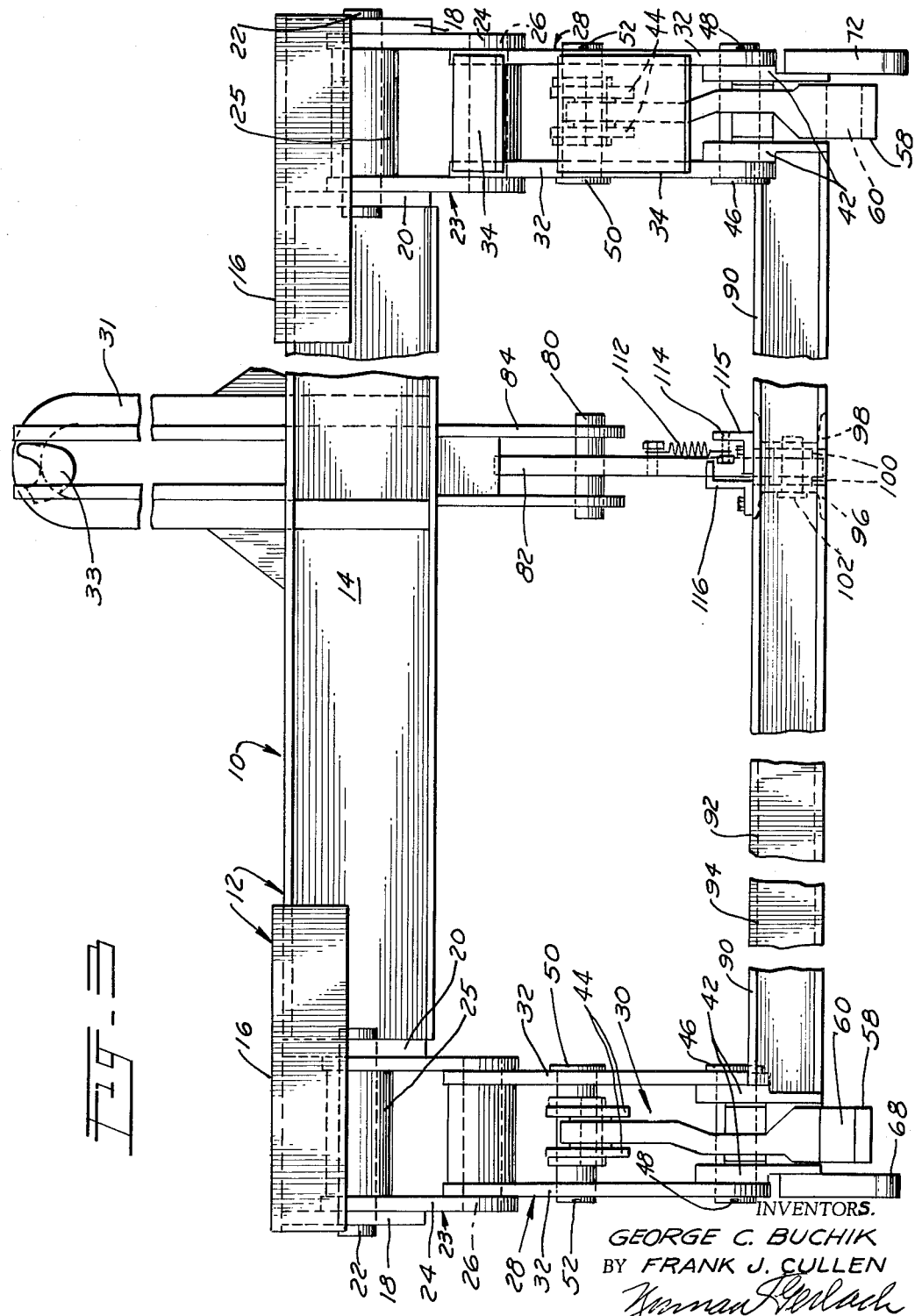

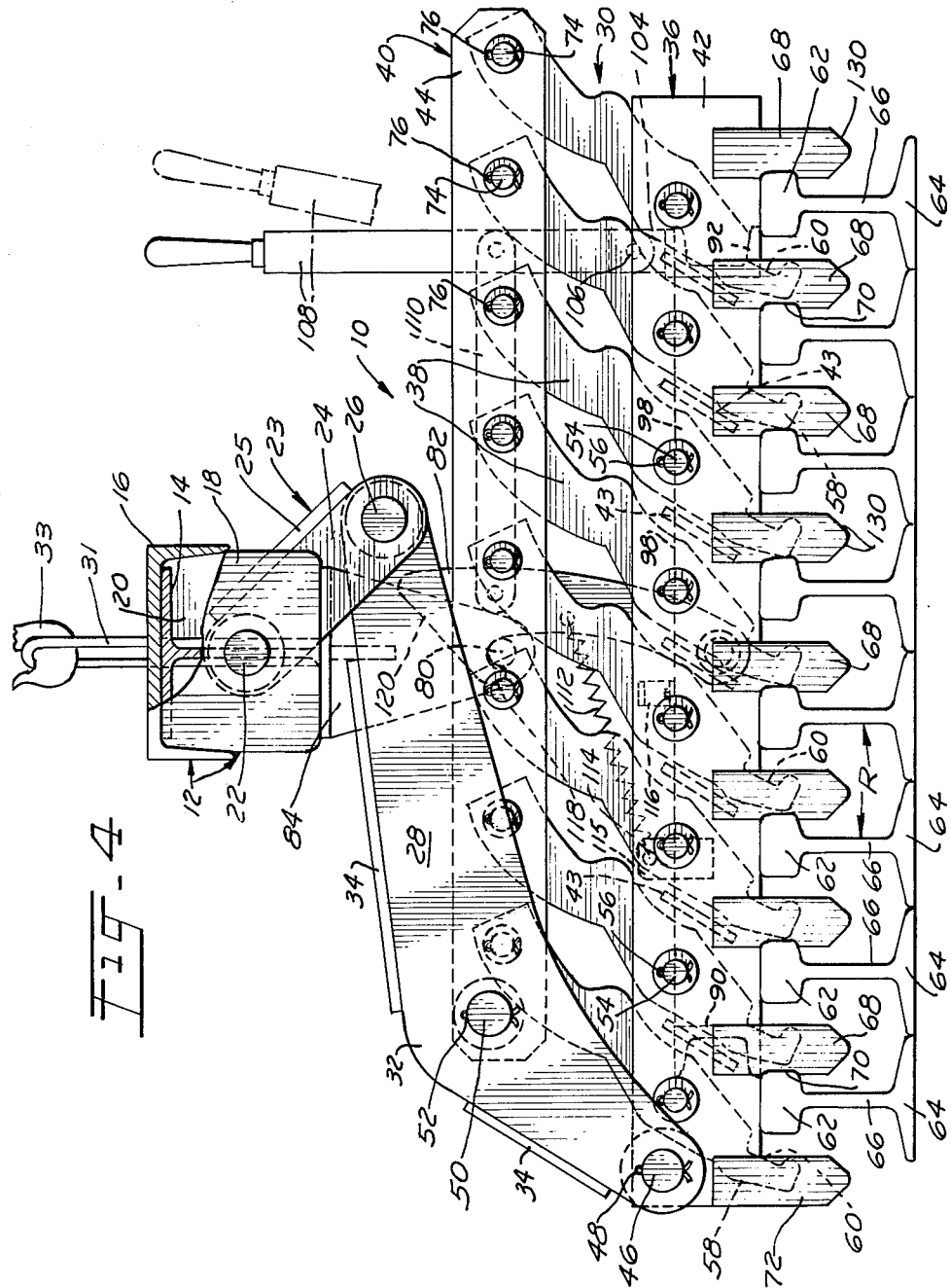

3,220,760
MULTIPLE RAIL LIFTER
George C. Buchik, Elmhurst, and Frank J. Cullen, Oak Park, Ill., assignors to Cullen-Friestedt Company, Chicago, Ill., a corporation of Delaware
Filed Sept. 12, 1963, Ser. No. 308,398
16 Claims. (Cl. 294—81)

The present invention relates to a lifting and transportion mechanism and has particular reference to a crane or hook-supported lifter by means of which a multiplicity of objects which have similar shape characteristics and are arranged in orderly fashion on a supporting surface may be lifted from the suporting surface, transported to a remote location, and deposited at the remote location in the same orderly arrangement. The invention has been designed specifically for the purpose of lifting and transporting railway track rails at the steel rolling mill in connection with loading or other handling of the rails, and has been illustrated and described herein in connection with such purpose. However, if desired, the invention may be found found useful for the multiple handling of the other relatively heavy objects of elongated design, as, for example, structural steel I-beams and elongated rods of different shapes. Irrespective, however, of the particular use to which the invention may be put, the essential features thereof are at all times preserved.

Heretofore, the multiple handling of railway track rails in lengths of from upwards of thirty feet has been considered impractical. Whereas with less heavy objects multiple handling thereof for lifting and transporting purposes may be accomplished by tying or binding the same in groups of four or five objects and then lifting and transporting the group en masse, the involved labor does not justify such a procedure in connection with track rails. Furthermore, handling of the rails for binding purposes is impractical when it is considered that a single rail possesses weight which is far beyond the lifting ability of two men. If the rails are still hot from the rolling process, manual lifting operations are hampered. Finally, to bind more than two or three track rails together for purposes of transportation by an overhead crane or hoist would entail problems of cable or chain handling for rail-binding purposes. For these reasons, railway track rails have heretofore been handled on an individual basis so that as many trips from the rail stock pile to the remote loading location as there are rail sections are required.

The present invention is designed to overcome the above-noted limitations that make multiple handling of railway track rails impractical, and toward this end, the invention contemplates the provision of a novel multiple jaw lifter which is capable of handling as many rails as there are jaws and is designed and adapted, first, to engage a multiplicity of rails in side-by-side and contiguous relationship, then, to lift and transport the rails to a remote location, and finally, to deposit the rails in their side-by-side and contiguous relationship on a supporting surface, as, for example, the deck of a flat car or the like. By thus depositing the rails in orderly side-by-side fashion on the supporting surface, little, if any, handling of the rails on the flat car or other terminal rail support is required, and it is contemplated that a single lifter in accordance with the present invention may handle as many as eight rails simultaneously, this being the maximum capacity of most flat cars presently in service for railway track rail transportation.

The provision of a multiple rail lifter of the aforementioned character being among the principal objects of the invention, it is a further object to provide such a lifter which will automatically adjust itself to the handling of different types of rails, such, for example, as standard wide and narrow gauge railway track rails of the T-head variety despite the difference in head width of such rails.

Another object of the invention is to provide a multiple rail lifter which has multiple rail-engaging jaws and in which the relative positions of the jaws, in relation to the respective reals which they engage, are identical so that all of the rails will be operated upon equally and simultaneously. For example, if in a series of rails to be lifted, any one rail is improperly engaged so that there is insufficient pressure to lift it from the supporting surface, then none of the rails will be properly engaged and elevation of the lifter bodily by the overhead crane or hoist will result in a failure to pick up any of the rails so that the lifter will remain empty. On the other hand, if any one rail in the series of rails is fully engaged, all of the rails will be so engaged and the crane operator will be assured that after the lifter has been elevated, all rails will be secure in the jaws which carry them and no rail will slip from its proper position of transport and fall from the elevated lifter or shift its position therein.

A still further object of the invention is to provide a multiple rail lifter which is so designed and constructed that, when suspended from an overhead crane or hoist, it offers a precise degree of balance whether the lifter be empty or fully loaded. In carrying out this last mentioned object, the invention contemplates the provision of two series of pairs of coacting rail-engaging jaws in which the pairs of coacting jaws of each series are disposed in side-by-side relationship and extend in a transverse row with respect to the parallel track rails which they engaged. The two series of pairs of coacting jaws are spaced apart longitudinally with respect to the rails so that corresponding pairs of coacting jaws in the two series engage and pick up their respective rails and support them at spaced longitudinal points along the rails, the center of gravity of the rails falling between the two pick-up points so that the rails will have a degree of stable equilibrium in transit. Each pair of coacting rail-engaging jaws includes a fixed reaction jaw which forms a part of the lifter framework, and in addition, a cooperating movable jaw, all of the movable jaws of each series of pairs of coacting jaws being connected together for movement in unison toward and away from their associated fixed reaction jaws. The individual movable jaws of each series operate upon a tongs principle and the upper ends of these movable jaws are connected together by a common operating bar which, in turn, is itself operated by a lever of the second class, the lever, in addition to performing its normal power magnification function, also serving as a suspension means for the group or series of jaws whose operation it controls. Each lever thus functions as a master tongs for supporting and actuating the individual jaw tongs which, in turn, engage and support the rails undergoing transportation. The rails undergoing transportation, before being engaged by the lifter, are arranged in side-by-side relationship and contiguity on the supporting surface with adjacent base flanges meeting or touching each other in edge-to-edge relationship. The rails, however, are in no way connected or tied together and each rail enjoys its own freedom of movement without regard to any other rail in the group or series. However, as soon as both series of pairs of coacting rail-engaging jaws engage or seize the group of rails to be lifted, the entire group becomes securely clamped in the lifter so that the group, in effect, becomes a rigid elongated planar platform-like multiple rail structure. A limited rectangular area of this rigid rail structure is supported directly beneath the lifter framework and the area is supported from one pair of diagonally disposed corners where there are pivotal connections, respectively, for the two jaw-actuating and suspension levers. The directions of extent of these two relatively massive jaw-actuating levers are opposite, and since their points of pivotal attachment to the lifter framework is near the diagonal corners of the framework and of the supported rail structure area beneath the framework, proper balance and horizontal maintenance of the framework and rails is at all times maintained. Additionally, by reason of the opposite directional extent of the two jaw-actuating levers, the direction of jaw-closing movements that are associated with the two series of pairs of coacting rail-engaging jaws is in opposite directions. Therefore, any inadvertent or accidental striking of the group of rails undergoing transportation with an adjacent foreign object or abutment will transmit the consequent shock to the movable jaws of only one series of jaws and never to both series so that inadvertent loss of rails is eliminated or reduced to a minimum.

A further object of the invention is to provide in a multiple lifter of the type and character under consideration, a novel automatically operable latch mechanism by means of which the empty lifter may be maintained in suspension with the various rail-engaging jaws thereof in their wide open positions, the latch mechanism being incapable of release while the lifter remains suspended but automatically becomes releasable when the lifter is lowered upon the rails to be lifted to the end that when the lifter is again raised and suspended from the overhead crane or hoist, the various jaws will close upon their respective rails for rail-elevating and transporting purposes.

A similar and related object of the invention is to provide such a lifter in which the latch mechanism is incapable of release while the filter and its load remains suspended, but which without attention on the part of the operator, automatically becomes effective to present jaw-closing movements after the load has been deposited upon the supporting surface at the end of a given transport of the load and the jaws opened to release the load. Thus, in accordance with this object, the operator may deposit a given load of rails upon the supporting surface by the simple expedient of lowering the lifter and its load until the supporting cables are slack. Thereafter, upon again raising the lifter, the latter will release the load and move vertically from the vicinity of the load, leaving the latter deposited on the supporting surface. The lifter jaws at this time will be maintained in their fully opened positions preparatory to lowering of the lifter upon the next series of rails to be lifted and transported.

A further object of the invention is to provide a multiple rail lifter which is generally of new and improved construction and in which high efficiency of operation is combined with a novel arrangement of component parts.

With these and other objects in view, which will become more readily apparent as the following description ensues, the invention consists in the novel construction, combination and arrangement of parts shown in the accompanying four sheets of drawing forming a part of this specification.

In these drawings:

FIG. 1 is a perspective view of a lifter constructed according to the principles of the present invention and showing the lifter in the operation of lifting and transporting a series of railway track rails of the T-head type;

FIG. 2 is an end elevational view, partly in section, of the lifter and rails of FIG. 1;

FIG. 3 is a side elevational view of the improved multiple rail lifter;

FIG. 4 is an end elevational view similar to FIG. 2 but showing the empty lifter suspended from the overhead crane and with the latch mechanism thereof effective to maintain the movable lifter jaws in their open positions; and FIG. 5 is a top plan view of the lifter framework which is associated with a pair of interconnected fulcrum frames that are employed in connection with the present lifter, the movable jaw mechanism being omitted in the interests of clarity.

Referring now to the drawings in detail, and in particular to FIG. 1, a multiple rail lifter constructed according to the present invention has been designated in its entirety by the reference numeral 10. The lifter as illustrated herein is designed for use in engaging, lifting and transporting relatively long railway track rails R of the T-head variety, it being feasible to design the lifter so that it will accommodate as many as eight rails with each rail sometimes as long as seventy-eight feet. Accordingly, the lifter 10 is shown in FIG. 1 as being in the operation of lifting or supporting eight rails R during the process of transporting the rails to a point of destination which may, for example, be the loading platform of a flat car or the like.

Briefly, the lifter 10 involves in its general organization an elongated narrow lifter framework 12 consisting principally of an I-beam 14 at each end of which there is welded in position a box-like structure including an inverted channel section 16 and an end plate 18. An inside plate 20 at each end of the I-beam 14 opposes the associated end plate 18 and the two plates 18 and 20 serve to support therebetween an upper suspension pin 22. Each suspension pin 22 constitutes an element of a depending composite equalizing link 23 which further includes a pair of spaced link straps 24, a connecting bridge plate 25 and a lower suspension pin 26. The two equalizing links 23 are thus disposed at opposite ends of the lifter framework 12 and each link serves to support a relatively massive tongs-actuating lever 28 and a multiple rail-gripping tongs structure 30. The two actuating levers 28 and the two multiple rail-gripping tongs structures 30 are substantially identical in their design and construction and, therefore, it is believed that a description of one actuating lever and its associated tongs structure will suffice for the other actuating lever and its associated tongs structure. It is to be noted, however, that the lever and tongs arrangements at the ends of the framework 12 are oriented in opposite directions, principally for weight-balancing reasons, as well as for other reasons that will be made clear presently.

As best seen in FIGS. 1 and 3, a U-shaped bail 31 has its side legs projecting through the top flange of the I-beam 14 and straddling the web of the I-beam at longitudinally spaced regions therealong. The legs of the bail are welded to the web of the I-beam and the bail 31 as a whole is disposed midway between the ends of the I-beam. The bail 31 is designed for lifting engagement with the lifting hook 33 of a conventional lifting crane or overhead hoist (not shown) and serves as a medium or instrumentality whereby the lifter as a whole may be operatively lifted and transported bodily during normal operation thereof.

Each tongs-actuating lever 28 is of a composite nature and comprises a pair of spaced side plates 32 across which there extends a series of tie plates 34. The upper end of each composite lever 28 is pivotally suspended from the lower suspension pin 26 of the associated equalizing link 23. The lower end region of each lever 28 is pivotally connected to a fulcrum frame 36 which establishes the fulcrum points for a series of rail-engaging tongs arms 38 in associated relation with the associated tongs structure 30. The medial region of each lever 28 is pivotally connected to a draw bar 40 which is pivotally connected to the upper ends of the associated tongs arms 38 and, therefore, is common to all of the arms.

Each fulcrum frame 36 and the associated draw bar 40 are of a composite nature, the former including spaced side members 42 with spacer plates 43 therebetween (see FIG. 5), and the latter including spaced side members 44. The pivotal connection between each fulcrum frame 36 and the associated lever 28 comprises a fulcrum pin 46 which is held in position by a cotter pin 48. The pivotal connection between each composite draw bar 40 and its associated lever 28 comprises a pin 50 which is held in position by a cotter pin 52.

The particular multiple rail lifter 10 which is illustrated herein has a capacity for handling eight rails and, accordingly, eight rail-engaging tongs arms 38 are associated with each fulcrum frame 36 and the associated draw bar 40. The various tongs arms 38 are identical in construction and each such arm is in the form of an elongated substantially vertical member which is pivoted medially of its ends on a crosspin 54 that extends between the two side members 42 of the associated fulcrum frame 36 and is held in position by a cotter pin 56. The lower end of each tongs arm 38 is provided with a rail-engaging jaw 58, the forward or operative surface of which is provided with a recess 60 which conforms to the configuration of the head portion of the rail which is to be engaged by the jaw.

The eight rails R which are to be lifted and transported by the lifter 10 are shown in FIGS. 1 and 2. They are of the T-head variety, as heretofore pointed out, and each rail includes a rail head 62, a base flange 64, and a rail web 66. The function of the various rail-engaging jaws 58 is to engage the rail heads 68 of the rails R and clamp them against fixed reaction jaws 68 which are carried by and depend from certain of the side members 42 of the fulcrum frames 36 as shown in FIG. 2. The rear surface of each reaction jaw 68 is provided with a recess 70 for rail head clamping purposes in cooperation with the opposed recess 60 in the associated jaw 58.

In order to accommodate the lifter 10, the eight rails R which are to be lifted and transported are pre-positioned on the supporting surface in side-by-side relationship with adjacent base flanges 64 thereof in abutment or contiguity. Since the rail heads 62 are appreciably narrower than the base flange 64, the rails R, when so positioned, present rail heads which are spaced apart so that there is sufficient clearance between adjacent rail heads to allow one reaction jaw 68 and one clamping jaw 58 to enter between adjacent rail heads when the lifter 10 is operatively lowered by the overhead crane or hoist upon the group of rails R. At the time that the lifter is thus lowered upon the rails R, each rail head 62 is straddled by one clamping jaw 58 and one cooperating reaction jaw 68 as shown in FIG. 4. In order that when the lifter is lowered upon the rails, the entire group of eight rails R will be wholly contained and there will be no tendency for lateral displacement of the outside rails in the group or series of rails, reaction posts 72, similar in shape to the reaction jaws 68, are provided on the side members 42 which support the two series of jaws 68. Since these reaction posts 72 perform no clamping function and have no cooperating clamping jaws associated therewith, they are devoid of clamping recesses, such as the recesses 70, in the fixed reaction jaws 68. Due to the particular arrangement of parts, the reaction posts 72 are arranged diagonally opposite one another. In other words, one of the posts 72 is located at the left side of the lifter as viewed in FIG. 2, and the other post 72 is located at the right side of the lifter as viewed in FIG. 2.

The upper free ends of each series of rail-engaging tongs arms 38 are operatively connected together for movement in unison by means of the previously mentioned associated draw bar 40. The pivotal connections between each composite draw bar 40 and the associated tongs arms 38 comprise pivot pins 74 which extend between the side members 44 and are held in position by means of cotter pins 76.

The tongs-actuating lever 28 which is shown in FIGS. 2 and 4 is movable between the lowered position wherein it is illustrated in FIG. 4 and the raised position wherein it is shown in FIG. 2. It assumes its lowered position at such time as the lifter 10 has been lowered by the crane operator upon a group of rails R to be picked up and transported, the associated fulcrum frame 36 resting directly upon the rail heads 62 so that, as the lifting hook 33 continues to move downwardly, the associated tongs-actuating lever 28 will swing under the influence of gravitational force and about the associated fulcrum pin 46 in a clockwise direction as viewed in FIGS. 2 and 4, thus causing the associated pin 50 to shift to the right so as, in turn, to shift the entire associated draw bar assembly 40 to the right and effect swinging movements of the various associated tongs arms 38 in a clockwise direction about their respective crosspins 54. Such swinging movements of the tongs arms 38 will serve to move the various movable jaws 58 away from their cooperating fixed jaws 68 so that the various aforementioned lifter parts assume the positions in which they are illustrated in FIG. 4. The other tong-actuating lever 28, that is, the lever which is not illustrated in FIGS. 2 and 4, operates in a similar manner but in a reverse direction.

When the lifter 10 is raised bodily by the overhead crane or hoist, the tongs-actuating lever 28 which is shown in FIGS. 2 and 4 is caused to swing in a counterclockwise direction as viewed in FIG. 4, thus causing the associated pin 50 to shift to the left so as, in turn, to shift the associated composite draw bar 40 to the right and effect counterclockwise swinging movements of the various associated tongs arms 38 about their respective crosspins 54. Such swinging movements of the last-mentioned tongs arms 38 effects jaw closing movements wherein the movable jaws swing toward their closed positions and engage the adjacent rail heads 62 and securely clamp the same against the associated fixed reaction jaws 68 so that the parts assume the positions in which they are illustrated in FIG. 2 with the rail heads 62 securely clamped between the recesses 60 and 70 of the various pairs of cooperating jaws 58 and 68. When the lifter is raised bodily as aforesaid, the other tongs-actuating lever operates in a similar manner but in the reverse or opposite direction.

It is to be noted at this point that the points of pivotal connection between the tongs arms 38 and the fulcrum frames 36 are displaced from the mid points of the tongs arms so that the movable jaws 58 have an effective length which is appreciably shorter than the operating or upper portions of these tongs arms. Thus, a relatively large power magnification is effected through the levers 28 and each tongs arms functions in the manner of a first class lever having a high power factor. It is also to be noted that the length of the various tongs arms 38, the center-to-center distance between fulcrum points of the tongs arms in the two fulcrum frames 36 at opposite ends of the lifter 10, and numerous other dimensional considerations have been calculated according to engineering expediencies in accordance with the width of a standard rail head so that when all of the movable and fixed jaws 58 and 68 are in clamping engagement with the respective rail heads on which they operate, the reaction exerted by the rail heads upon the movable jaws 58 is such that the fulcrum frames 36, the draw bars 40, and the rails R extend substantially horizontally. This horizontal suspension of the lifter parts and the rails R is further enhanced by reason of the fact that the distal ends of the fulcrum frames 36 and the draw bars 40 at opposite ends of the lifter framework 12 extend in opposite directions as best seen in FIG. 1. The weight of the various dual lifter parts, particularly of the two relatively massive tongs-actuating levers 28, is thus balanced, and this fact, together with the low center of gravity of the lifter and its load, contributes toward truly horizontal maintenance of rails when in transit.

In order to maintain the fulcrum frames 36 and the draw bars 40 in their respective substantially horizontal positions and thus balance the lifter 10 as a whole, as well as to maintain the rail-gripping jaws 58 and 68 in their fully open positions when the empty lifter is being transported by the overhead crane or hoist, releasable latch means including a latch pin 80 (see FIGS. 1 and 3) on the lifter framework 12 and a cooperating movable latch member 82 are provided. The latch pin 80 is carried at the lower end of a pair of depending spaced apart suspension plates 84 which are of generally triangular configuration and are secured to the underneath side of the base flange of the I-beam 14 in the medial region of the latter.

Referring now to FIGS. 1 and 5, the two fulcrum frames 36 at the ends of the lifter 10 are rigidly connected together by means of front and rear cross members 90 and 92. Diagonal reinforcing struts 94 extend between the medial regions of the cross members and the medial regions of the inside plates 42 of the fulcrum frames 36. A pair of slightly spaced apart parallel members 96 and 98 extend between the cross members 90 and 92 and have formed thereon at their medial regions opposed bosses 100 through which there extends a pivot pin 102 for the latch member 82. At their rear ends, the members 96 and 98 carry a pair of supporting brackets 104 between which there extends a pivot pin 106 (see FIG. 4) for the lower end of an upstanding latch-operating lever 108. The latch-operating lever 108 is operatively connected by a link 110 to the distal end of the latch member 82. A spring 112 which is connected at one end to the latch member 82 and at its other end to a pin 114 on a bracket 115 on the member 98 normally urges the latch member 82 forwardly and against a limit stop 116 (see FIG. 3) on the member 96. The latch member 82 is formed with a hook 118 at its distal end and the latter is designed for latching engagement with the latch pin 80 when the empty lifter 10 is in transit. When the hook 118 and the latch pin 80 are in latching engagement as shown in FIG. 4, the upward pull which is exerted by the lifting hook 33 on the bail 31 and, consequently, upon the lifter framework 12 as a whole, will be transmitted through the depending suspension plates 84 and latch pin 80 to the latch member 82 and from thence directly to the framework which connects the two fulcrum frames 36. The pulling force which normally is applied to the equalizing links 23 and tongs-actuating levers 28 when the latch mechanism is in its unlatched condition is thus relieved so that as the lifter 10 moves bodily upwardly, the composite tongs-actuating levers 28 remain in their lowered positions and no pulling force is applied to the draw bars 40 and the various pairs of coacting rail-gripping jaws 58, 60 remain in their open positions.

It should be noted at this point that the upper edge 120 of the latch member 82 above the hook 118 is inclined with respect to the slightly curved axis of the lever 108. This inclined edge 120 constitutes a cam surface which is designed for camming engagement with the descending latch pin 80 as the lifter framework 12 is being lowered by the overhead crane or hoist after a given group of rails R have been deposited on a supporting surface. The descending latch pin 80 pushes the latch member to one side against the yielding action of the spring 112, and after the latch pin has moved below the level of the cam surface which is afforded by the edge 120, the latch member moves into position beneath the hook 118 under the influence of the spring 112 so that when the lifter is again raised, the latch mechanism becomes effective to raise the lower framework which is associated with the fulcrum frames 136 and thus prevent closing of the rail-engaging jaws 58, 68, as previously set forth.

Operation

From the foregoing description, it is believed that the nature and operation of the lifter 10 will, for the most part, be apparent, especially since many of the operative instrumentalities, such as the jaw-actuating mechanism including the draw bars 40 and the tongs-actuating levers 28, the latch mechanism including the latch pin 80 and the latch member 82, and the articulated nature of the various sub-assemblies which cooperate to make up the lifter as a whole, have been described in connection with their individual modes of operation. Therefore, a brief description of the operation of the lifter extending through its performance when initially picking up a group of rails R, when transporting the lifted rails to a region of destination, and when depositing the rails on a supporting surface at such destination, will be sufficient to afford a thorough understanding of the lifter 10 and the manner in which it is normally used in practice.

As previously stated, the exemplary form of lifter as described herein has a capacity for handling eight rails R, and although the lifter may be employed for lifting and transporting a lesser number of rails, it will be assumed that a full complement of eight rails are to be moved from one location to another location. The rails R to be transported are arranged in side-by-side relationship on the supporting surface at the initial location with the base flanges 64 of adjacent rails in coextensive contiguity as shown in FIG. 4. As a consequence of such prepositioning of the rails R, the various rail heads 62 will extend in parallelism and in slightly spaced relationship so that there will be sufficient space between adjacent rail heads for entry of the various fixed and movable jaws between adjacent pairs of rail heads. The contiguous rails, considered as a whole, will present an elongated rectangular area over the floor space and the operator of the overhead crane or hoist will bring the elevated lifter 10 in the condition in which it is illustrated in FIG. 4 over this area so as to center the lifter medially between the rail ends. The operator will then cause the lifter to be lowered bodily onto the rails.

Prior to engagement of the lifter with the rails, the aforementioned latch mechanism will be effective to link the fulcrum frames 36 and their connecting frameworks or assemblies (parts 90, 92, 94) directly to the upper lifter framework 12 and to support the subjacent fulcrum frames 36 from the upper framework 12 thus to disable the tongs-actuating levers 28 and to maintain the movable jaws 58 of the tongs arms 38 widely separated from their cooperating fixed jaws 68. It is to be noted at this point that when the movable jaws 58 are thus retracted, each movable or pivoted jaw 58 becomes substantially transversely aligned with the fixed jaw 68 of the next adjacent pair of cooperating jaws so that the movable jaw of one pair and the fixed jaw of the next adjacent pair consume but little longitudinal space. The over-all extent of the thus temporarily aligned fixed and movable jaws is appreciably less than the distance between adjacent rail heads so that the operator of the overhead crane or hoist may then align the various paired jaws 58 and 68 vertically with the inter-rail spaces between adjacent rail heads 62 and drop the lifter bodily upon the rails R and cause the paired jaws to enter between the inter-rail spaces. Such entry of the paired jaws between the adjacent pairs of rail heads 62 is facilitated by tapering the lower ends of the fixed reaction jaws 68 as indicated at 130 in FIGS. 2 and 4. Thus, any slight miscalculation on the part of the operator of the overhead crane or hoist will be compensated for by a camming action of the tapered lower ends of the reaction jaws 68 which will guide the fulcrum frames 36 into position on the rail heads 62 and cause them to assume their proper seated position on the rails R.

The lower ends of the fixed reaction posts 72 (see FIGS. 2 and 4) also are tapered for guide purposes. These reaction posts, which are located at opposite ends of the two series or rows of eight fixed reaction jaws, serve the additional function of containing the outside rails R in the series in the event that such rails tend to become dislodged laterally when lowering the lifter upon the group or series of rails. The intermediate rails are contained between adjacent fixed reaction jaws 68.

When the lifter drops upon the group or series of eight rails R, the lower edges of the side members 42 of the fulcrum frames 36 come to rest upon the upper surfaces of the rail heads 62, thus arresting further downward movement of the fulcrum frames so that as the upper lifter framework 12 continues to be lowered, the latch pin 80 will move downwardly and away from the overlying hook 118 of the latch member 82, thus releasing the latch member for manipulation through the medium of the operating lever 108 and the associated link 110.

Upon forward pulling of the lever 108 by the ground or lifter operator, the link 110 will cause the latch member 82 to be swung in a clockwise direction as viewed in FIG. 4, the lever assuming the dotted-line position in which it is shown in FIG. 4. Motion of the lever 108 will be transmitted to the latch member 82 through the link 110 and the latch member will move out of vertical register with the latch pin 80. While the ground operator maintains the lever 108 thus retracted, the crane operator will again cause the lifter 10 to be raised bodily, at which time the two tongs-actuating levers 28 will swing about the axes of the fulcrum pins 46, one lever moving in a generally clockwise direction as viewed in FIG. 1, and the other lever moving generally in a counterclockwise direction. Such movements of the two levers 28 serve to pull the two draw bars 40 in opposite directions, each draw bar operating to shift the positions of the various tongs arms 38 and cause the associated movable jaws 58 to swing toward their respective fixed reaction jaws 68 to engage the adjacent rail heads 62 therebetween.

When the paired jaws on opposed sides of the rail heads 62 close upon the rail heads, the latter are encompassed or straddled by the opposed pairs of recesses 60 and 70 so that upon raising of the lifter vertically, each rail head is supported by pairs of upwardly facing shoulders as well as by the inherent clamping action which is offered between the jaws due to the tongs action of the arms 38 which, as heretofore stated, offer an appreciable power magnification. The levers 28 also offer a degree of power magnification inasmuch as the pivot pins 50 for the draw bars 40 are closer to the fulcrum pins 46 than they are to the lower suspension pins. This latter power magnification, when compounded with the power magnification which is offered by the tongs arms 38 results in a powerful clamping action against each rail head 62 by the opposed associated jaws 58 and 68.

Because of the close tolerances that are maintained in the manufacture of railway track rails at the rolling mill, substantially equal jaw pressure will attain against the sides of the various rail heads by the opposed pairs of clamping jaws. However, in the unlikely event that any one pair of jaws will engage a given rail head at a region where full jaw pressure is attained by such a pair of jaws before the other jaws have exerted their full inward pressure on their respective rail heads, such a condition occurring possibly by reason of the loading of a small foreign particle between one jaw and the rail head, no danger of loss of any of the other seven rails will result inasmuch as each rail head is partially encompassed by the straddling recesses 60 and 70 on the jaws 58 and 68, respectively.

After the opposed pairs of jaws 58, 68 have securely engaged their respective rail heads incident to raising of the lifter bodily, continued upward movement of the lifter will cause the rails R to be picked up or lifted from the supporting surface, and thereafter, the operator of the overhead crane or hoist may transport the lifter and the rails that are suspended thereby to the remote location. The rails R and the fulcrum frames 36 on which they are carried will remain horizontal during such movement of the lifter to the remote location where the rails are to be deposited due to the diagonal suspension phenomena that has been previously set forth.

Upon arrival of the lifter at the remote location where the rails R are to be deposited on the supporting surface, for example, the deck of a flat car, it is merely necessary for the operator of the overhead crane or hoist to align the lifter and rails vertically with the area of deposition and then to lower the lifter bodily. As soon as the rails touch the supporting surface, their weight on the lifter is relieved and the lifter then becomes seated on the rails with the lower edges of the fulcrum frames 36 resting upon the rail heads 62. Continued lowering of the lifting hook 33 will allow the equalizing links 23 and the levers 28 to move downwardly, the levers 28 swinging in opposite directions and thus causing the draw bars 40 to swing their respective tongs arms 38 in gang fashion in such directions as to cause the movable jaws 58 to move away from the fixed reaction jaws 68 to release the clamping action on the various rails R.

After the rails R have been released as set forth above, the operator of the overhead crane or hoist will then cause the lifter 10 to be again raised vertically. Because of the fact that during descent of the lifter for rail deposition purposes, the latch pin 80 will have moved beneath the latch hook 118 on the latch member 82 and will be in vertical register with this hook, such raising of the lifter by the operator will cause the latch pin 80 to engage the hook and transmit the weight of the fulcrum frames 36 and their connecting frameworks (parts 90, 92, 94) directly to the lifter framework 12. The two levers 28 will thus be completely relieved of any vertical pulling forces and the lifter will rise from the deposited rails R with the various rail-engaging jaws 58, 68 in their open condition. The operator may then transport the empty lifter back to the source of rail supply for engagement with the next group of eight rails R which will have been prepared for lifting by the operators at such source.

Although the present lifter has been designed for use in carrying a maximum of eight rails R, it is possible to use the lifter for lifting and transporting a lesser number of rails. In such an instance, whatever rails are available for lifting and transportation will be arranged on the supporting surface in an appropriate manner for cooperation with the fulcrum frames 36 to attain proper balance of the lifter after the rails have been elevated from the supporting surface. For example, if only two rails are to be lifted, these rails may be arranged in side-by-side contiguity and the two innermost pairs of jaws 58, 68 of the two series of jaws caused to engage these rails. Alternatively, the rails may be spaced apart in parallelism on the supporting surface so that the two pairs of jaws at the extreme ends of the filter, or any two pairs of jaws which are equally spaced from the longitudinal center line of the lifter, will engage the rails.

The invention is not to be limited to the exact arrangement of parts shown in the accompanying drawings or described in this specification as various changes in the details of construction may be resorted to without departing from the spirit or scope of the invention. Therefore, only insofar as the invention has particularly been pointed out in the accompanying claims is the same to be limited.

Having thus described the invention what we claim as new and desire to secure by Letters Patent is:

1. In a multiple lifter of the character described, a lifter framework including means whereby the same may be operatively connected to an overhead hoist, a jaw-supporting frame disposed below and suspended from said framework, a plurality of fixed reaction jaws on said jaw-supporting frame and designed for engagement with corresponding sides of a series of objects to be lifted, a plurality of movable clamping jaws mounted on said jaw-supporting frame for movement toward and away from said fixed reaction jaws, said movable clamping jaws being designed for engagement with the opposite corresponding sides of the series of objects to be lifted, an actuating bar connected to said movable jaws for effecting movement of the latter in unison, and a second class lever having its fulcrum point on the jaw-supporting frame and having its free end pivoted to the lifter framework, a medial region of the lever being pivoted to said actuating bar whereby the latter is movable under the control of vertical lifting movements imparted to the lifter framework by said overhead hoist.

2. In a multiple rail lifter of the character described, in combination, a lifter framework including means whereby the same may be operatively connected to an overhead hoist, a fulcrum frame disposed below said framework, a plurality of fixed reaction jaws on said fulcrum frame and designed for engagement with corresponding sides of a series of rails arranged in side-by-side contiguity, a plurality of tongs arms pivoted medially of their ends to said fulcrum frame above the level of said fixed reaction jaws and having clamping jaws at their lower ends movable toward and away from said fixed reaction jaws, said clamping jaws being designed for engagement with the opposite corresponding sides of the rails, a draw bar connected to the uper ends of said tongs arms for effecting movement of the arms in unison, and means extending between said lifter framework and the draw bar for effecting movement of the latter incident to relative vertical displacements between the lifter framework and the fulcrum frame, said last-mentioned means comprising a lever of the second class having its fulcrum point on said fulcrum frame and having its free end pivotally connected to the lifter framework, a medial region of the lever being pivoted to said draw bar.

3. In a multiple rail lifter of the character described, in combination, a lifter framework including means whereby the same may be operatively connected to an overhead hoist, an elongated fulcrum frame disposed below said framework, a plurality of fixed reaction jaws on said fulcrum frame and designed for engagement with corresponding sides of a series of rails arranged in side-by-side contiguity, a plurality of tongs arms pivoted medially of their ends to said fulcrum frame above the level of said fixed reaction jaws and having clamping jaws at their lower ends movable toward and away from said fixed reaction jaws, said clamping jaws being designed for engagement with the opposite corresponding sides of the rails, an elongated draw bar overlying the fulcrum frame and connected to the upper ends of said tongs arms for effecting movement of the arms in unison, a lever of the second class having its fulcrum point on said fulcrum frame and having its free end pivotally connected to the lifter framework, a medial region of the lever being pivoted to said draw bar whereby the latter is movable under the control of vertical lifting movements imparted to the lifter framework by said overhead hoist, and cooperating releasable latch means on said lifter framework and the fulcrum frame for preventing vertical displacement of the lifter framework in an upward direction relative to the fulcrum frame to thus disable the draw bar moving means.

4. A multiple rail lifter as set forth in claim 3 and wherein said releasable latch means comprises a latch pin on the lifter framework and a cooperating latch member on the fulcrum frame positioned in the path of movement of the latch pin during lowering of the lifter framework toward the fulcrum frame.

5. A multiple rail lifter as set forth in claim 3 and wherein the fulcrum point for the lever on the fulcrum frame is disposed at one end of the latter, and wherein the pivotal connection between the lever and the draw bar is disposed at the corresponding end of the latter.

6. In a multiple rail lifter for lifting and transporting a plurality of T-head rails which are disposed on a supporting surface in parallel side-by-side relationship with their base flanges in coextensive contigous contact so that their rail heads extend in slightly spaced parallelism and establish entry voids between adjacent rail heads, in combination, a lifter framework including means whereby the same may be operatively connected to an overhead hoist, an elongated fulcrum frame disposed below said framework, a plurality of equally spaced fixed reaction jaws depending from said fulcrum frame and designed for engagement with corresponding side faces of the rail heads, a plurality of tongs arms pivoted medially of their ends to said fulcrum frame at spaced points therealong above the level of said fixed reaction jaws and having clamping jaws at their lower ends movable toward and away from said fixed reaction jaws, said clamping jaws depending below the fulcrum frame and being movable between retracted and advanced positions toward and away from the fixed reaction jaws for engaging the opposite corresponding side faces of the rail heads against corresponding and cooperating fixed reaction jaws, an elongated draw bar overlying the fulcrum frame and extending parallel thereto, said draw bar being pivotally connected to the upper end of each of the tongs arms for effecting movement of the latter in unison, a lever of the second class having its fulcrum point on said fulcrum frame and having its free end pivotally connected to the lifter framework, a medial region of the lever adjacent to its fulcrum point being pivoted to the draw bar whereby the latter is movable under the control of vertical movements imparted to the lifter framework by said overhead hoist, said movable clamping jaws being laterally displaced from the fixed reaction jaws, each movable clamping jaw, when in its retracted position, being in transverse register and paired with a fixed reaction jaw which is next adjacent to its corresponding and cooperating fixed reaction jaw, the overall extent of such registering clamping and fixed reaction jaws being less than the width of the entry voids between rail heads so that the paired jaws may enter such voids when the lifter is lowered upon the rails, and cooperating releasable latch means on said lifter framework and the fulcrum frame for preventing vertical displacement of the lifter framework in an upward direction relative to the fulcrum frame to thus disable the draw bar moving means.

7. A multiple rail lifter as set forth in claim 6 and wherein the releasable latch means comprises a latch pin on the lifter framework and a cooperating latch member on the fulcrum frame positioned in the path of movement of the latch pin during lowering of the lifter framework toward the fulcrum frame.

8. A multiple rail lifter as set forth in claim 6 and wherein the fulcrum point for the lever on the fulcrum frame is disposed at one end of the latter, the pivotal connection between the lever and the draw bar is disposed at the corresponding end of the latter, and said lever lies wholly within the extended vertical confines of the fulcrum frame.

9. A multiple rail lifter as set forth in claim 6 and wherein the lower end of each fixed reaction jaw is tapered to facilitate entry of the jaw, together with the movable clamping jaw with which it is transversely aligned, into the corresponding void between rail heads.

10. In a multiple rail lifter for lifting and transporting a plurality of T-head rails which are disposed on a supporting surface in parallel side-by-side relationship with their base flanges in coextensive contiguous contact so that their rail heads extend in slightly spaced parallelism and establish entry voids between adjacent rail heads, in combination, an elongated longitudinally extending upper lifter framework adapted to extend parallel to the rails when the latter are engaged by the lifter and including means whereby the framework may be operatively connected to an overhead hoist, an elongated transversely extending fulcrum frame disposed below each end region of the framework, a lower framework rigidly connecting the two fulcrum frames, a plurality of equally spaced fixed reaction jaws depending from each fulcrum frame, said jaws being designed for entry into the voids and engagement with corresponding side faces of the rail heads, a plurality of tongs arms pivoted medially of their ends to said fulcrum frame at spaced points therealong above the level of said fixed reaction jaws and having clamping jaws at their lower ends movable toward and away from said fixed reaction jaws, said clamping jaws depending below the fulcrum frame and being movable between retracted and advanced positions toward and away from the fixed reaction jaws for engaging the opposite corresponding side faces of the rail head and clamping the latter against corresponding and cooperating reaction jaws, an elongated draw bar overlying each fulcrum frame in parallel relationship, said draw bar being pivotally connected to the upper end of each of the tongs arms of its respective fulcrum frame for effecting movement of the tongs arms in unison, and a lever of the second class overlying each fulcrum frame within the extended vertical confines thereof and having its lower end pivotally connected to one end of the fulcrum frame, its upper end pivotally connected to the lifter framework, and a medial region thereof pivotally connected to the adjacent draw bar whereby the latter is movable under the control of vertical movements imparted to the lifter framework by said overhead hoist.

11. A multiple rail lifter as set forth in claim 10 and including, additionally, releasable latch means on said upper lifter framework and the lower framework for preventing vertical displacement of the lifter framework in an upward direction relative to the lower framework to thus disable the draw bar moving means.

12. A multiple rail lifter as set forth in claim 10 and wherein the lower ends of the levers are pivotally connected to their respective draw bars at ends of the draw bars which are oppositely disposed in a direction transversely of the lifter so that the levers move in unison in opposite directions during raising and lowering of the upper framework relative to the lower framework.

13. A multiple rail lifter as set forth in claim 10 and wherein the movable clamping jaws of each fulcrum frame are laterally displaced from the fixed reaction jaws thereof, wherein each movable clamping jaw, when in its retracted position, is in transverse register and paired with a fixed reaction jaw which is next adjacent to its corresponding and cooperating fixed reaction jaw, the over-all extent of such registering clamping and fixed reaction jaws being less than the width of the entry voids between adjacent rail heads so that the paired jaws may enter such voids when the lifter is lowered upon the rails.

14. A multiple rail lifter as set forth in claim 10 and wherein cooperating fixed reaction and movable clamping jaws are provided with opposed recesses therein which encompass the sides of the rail heads when the clamping jaws are in their advanced clamping positions.

15. A multiple rail lifter as set forth in claim 10 and including, additionally, a fixed reaction post on each fulcrum frame depending below the frame at the end to which the associated lever is pivoted, said reaction post being spaced from the adjacent reaction jaw a distance equal to the spacing between adjacent reaction jaws.

16. A multiple rail lifter as set forth in claim 10 and wherein the lower ends of the levers are pivotally connected to their respective draw bars at the ends of the draw bars which are oppositely disposed in a direction transversely of the lifter so that the levers move in unison in opposite directions during raising and lowering of the upper framework relative to the lower framework, and wherein each movable clamping jaw, when in its retracted position, is in transverse register and paired with a fixed reaction jaw which is next adjacent to its corresponding and cooperating fixed reaction jaw, the over-all extent of such registering clamping and fixed reaction jaws being less than the width of the entry voids between adjacent rail heads so that the paired jaws may enter such voids when the lifter is lowered upon the rails, the cooperating fixed reaction and movable clamping jaws being formed with opposed rail head-engaging recesses therein designed to straddle the rail head when the movable clamping jaws are in their advanced clamping positions.

References Cited by the Examiner
UNITED STATES PATENTS

| 2,866,660 | 12/1958 | McGuire | 294—63 |
| 2,902,311 | 9/1959 | Reel | 294—67 X |

FOREIGN PATENTS

| 890,708 | 11/1943 | France. | |

SAMUEL F. COLEMAN, *Primary Examiner.*